United States Patent [19]

Sartor et al.

[11] Patent Number: 4,618,226
[45] Date of Patent: Oct. 21, 1986

[54] SPRING MOUNT HINGE FOR EYEGLASSES BOWS

[75] Inventors: Rino Sartor, Montebelluna; Giampietro Bottega, Segusino, both of Italy

[73] Assignee: Celes Optical S.r.l., Pederobba, Italy

[21] Appl. No.: 575,641

[22] Filed: Jan. 30, 1984

[30] Foreign Application Priority Data

Feb. 4, 1983 [IT] Italy ............................ 41521 A/83

[51] Int. Cl.[4] .............................................. G02C 5/16
[52] U.S. Cl. ...................................... 351/113; 351/111
[58] Field of Search ................................ 351/113, 114

[56] References Cited

U.S. PATENT DOCUMENTS 1,599,843  9/1926  Schumacher ...................... 351/113
3,923,384  12/1975  LeBlanc ............................ 351/113

Primary Examiner—John K. Corbin
Assistant Examiner—P. M. Dzierzynski
Attorney, Agent, or Firm—Guido Modiano; Albert Josif

[57] ABSTRACT

This eyeglasses temple comprises a leg portion and spring-loaded devices for enabling the leg opening to occur elastically beyond an overcenter position, and enabling the leg to be closed with a snap action. The spring-loaded devices comprises a leaf spring, pivotally inserted into a pocket formed in the eyeglasses leg and acting with its free end onto a head portion made rigid with the eyeglasses frame, and shaped to provide two stable opened-closed positions for the leg, resilient extra opened positions and an opening travel limit stop therefor.

10 Claims, 12 Drawing Figures

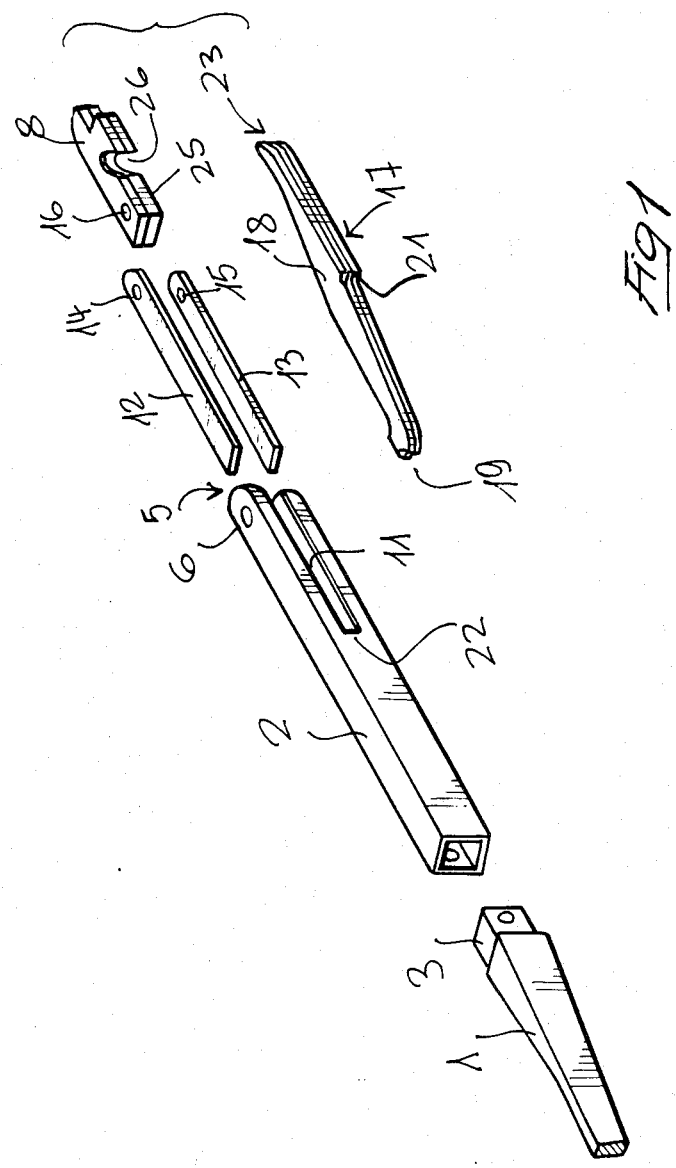

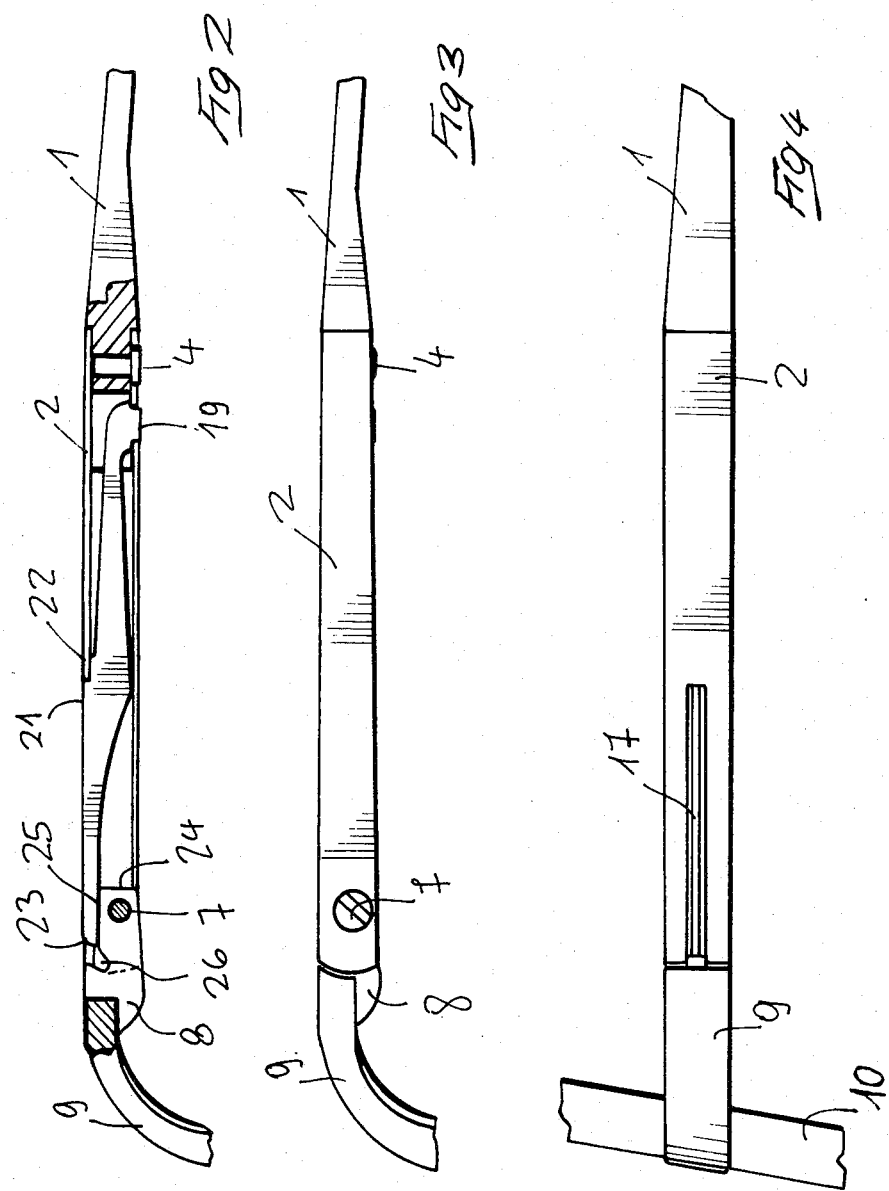

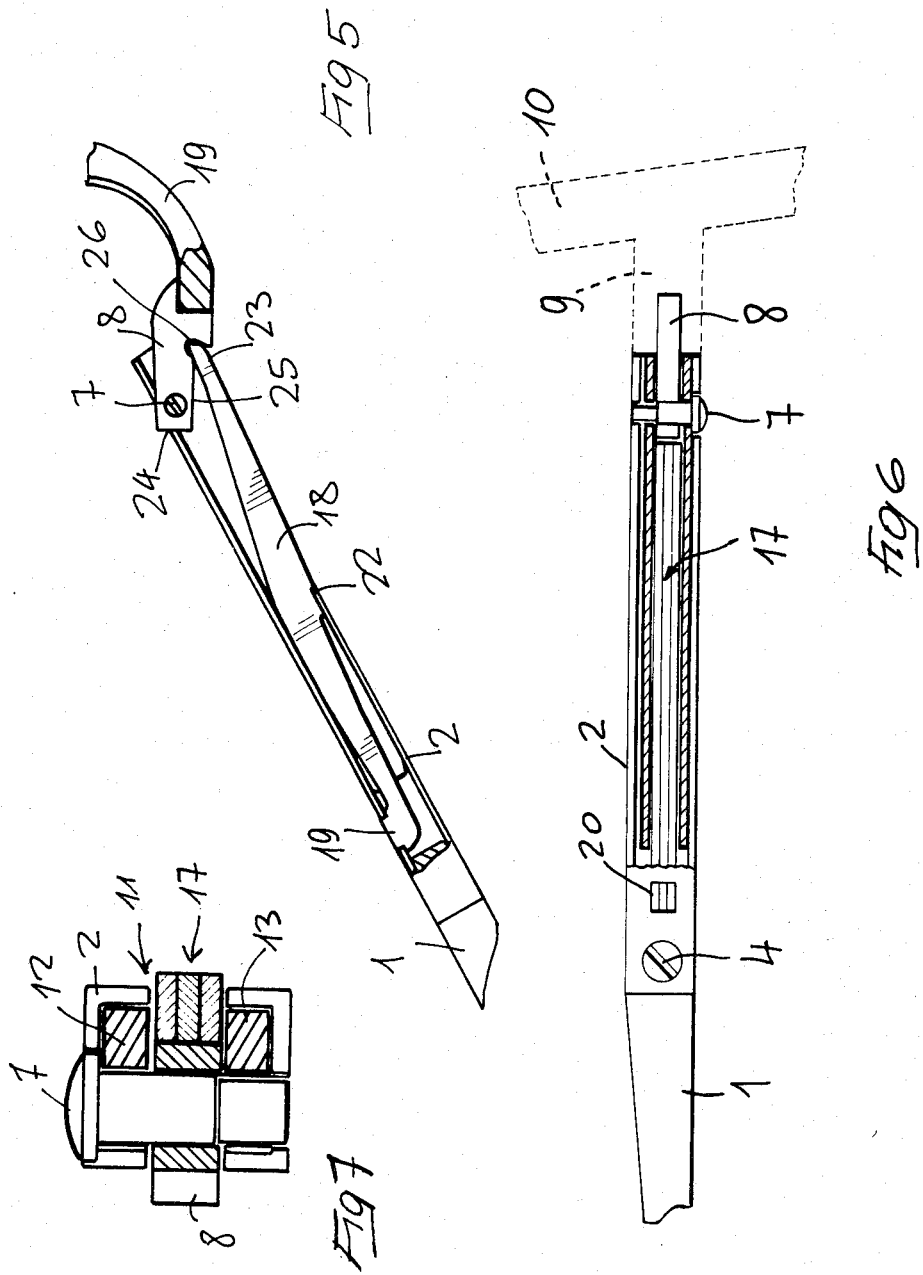

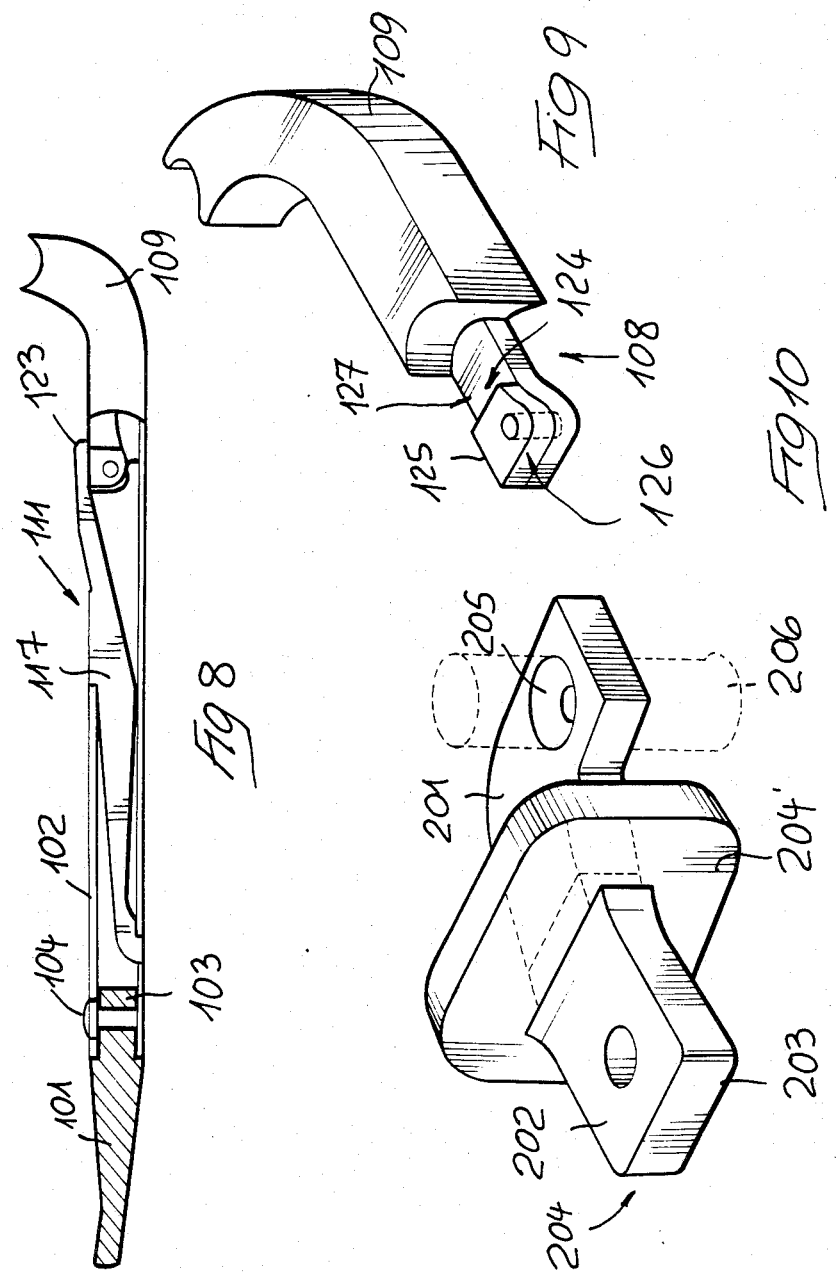

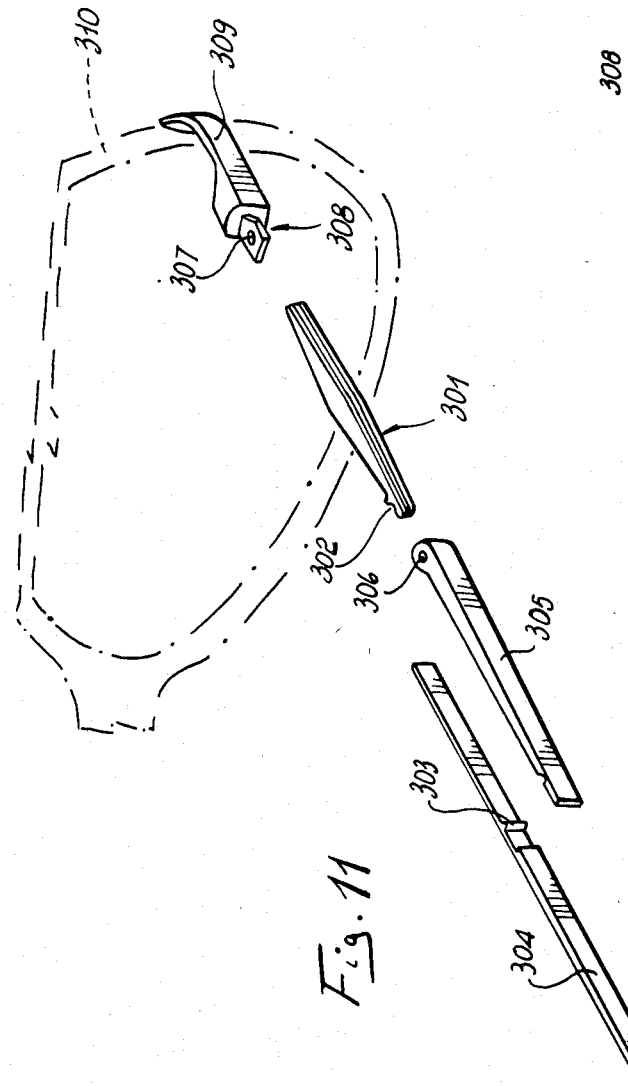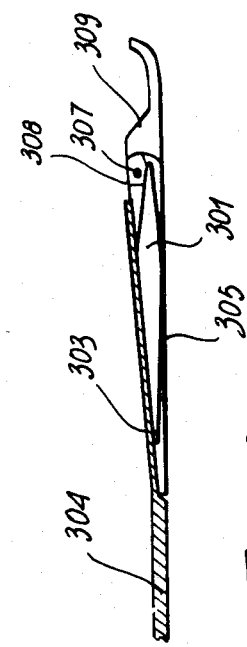

SPRING MOUNT HINGE FOR EYEGLASSES BOWS

BACKGROUND OF THE INVENTION

This invention relates to an eyeglasses hinge having devices adapted to provide for the elastic opening and snap-action closing of the eyeglasses legs or bows.

Several arrangements for making an eyeglasses leg mount elastic are known in the art. More specifically, eyeglasses legs are known which have a seat formed therein to accommodate a small spring-loaded ball acting on a cam rigidly attached to the front portion of the eyeglasses.

Accordingly, and depending on the cam shape, the leg may have two stable positions into which the spring biased ball can move, and such positions will usually correspond to a condition of full closure of the legs and one of opening of the same to a substantially perpendicular position to the frame main plane.

By suitably shaping the cam, the leg may be moved to a position past the opened one, which position is an unstable one in that, on releasing the leg, the latter is returned to its perpendicular position to the frame.

By suitably shaping the leg, or by some other means affecting the ball movement, it is also known to provide a travel limit for the elastic overshooting of the opened position.

Such prior spring mounted hinges, commonly called "elastic hinges", are specially complex and difficult to manufacture. More specifically, it is complicated to form a seat for the ball to move therein, and another seat to accommodate a cylindrical coil spring biasing the ball toward the cam. In addition, the cam must be made of a specially hard material, and the spring bias force considerable, in order to provide sufficiently stable closed or home and normally opened positions.

A further problem encountered with such prior hinges is that any treatments, such as of a galvanic kind, cannot be applied to the eyeglasses frame with the latter in a fully assembled condition, because this would adversely affect the proper operation of the ball/spring arrangement.

SUMMARY OF THE INVENTION

It is an object of this invention to provide a hinge having elastic devices effective to provide two stable positions for the eyeglasses legs, as well as an elastic extra opened position with a travel limit stop for the extra position.

Another object is to provide elastic devices as indicated, which are inherently simple, easily assembled, and readily associable with the eyeglasses legs at the hinge connection areas thereof.

It is a further object of the invention to provide elastic devices as indicated which are quite separate from the hinge, and may accordingly be associated therewith at any time, specifically after the eyeglasses frame has been fully assembled.

Still another object is to provide such devices which may be associated with the hinge after the latter has been subjected to any desired treatments.

Yet another object of this invention is to provide such devices which can operate under low pressure conditions, thereby more easily processed and less expensive materials may be used for their manufacture.

These and other objects, such as will be apparent hereinafter, are achieved by a springed hinge device for an eyeglasses bow, comprising a head member rigid with a front portion of an eyeglasses frame, a leg portion of the eyeglasses bow pivoted to said head member, characterized in that said leg portion has a pocket formation, a leaf spring having one part thereof inserted into said pocket formation and having another free end portion thereof in engagement with said head member, said head member having a number of differentiated engagement surfaces for said free end portion of said leaf spring to determine a plurality of stable angular positions of said leg portion with respect to said head member.

BRIEF DESCRIPTION OF THE DRAWINGS

Further features and advantages of the invention will be more clearly understood from the following detailed description of some embodiments thereof, given herein by way of example and not of limitation with reference to the accompanying drawings, where:

FIG. 1 is an exploded perspective view showing all the parts which make up the hinge and provide for its elastic features;

FIG. 2 is a partly sectional plan view of the hinge leg showing the elastic devices;

FIG. 3 is a plan view of the leg and hinge;

FIG. 4 is a side elevation view of the leg and hinge;

FIG. 5 is a partly sectional view showing this hinge in an extra opened position;

FIG. 6 is a partly sectional side elevation view of the hinge and leg;

FIG. 7 is a sectional view of the leg taken through the pivot point thereof;

FIG. 8 shows a modification of the elastic devices, as depicted in a sectional view through the leg and hinge;

FIG. 9 is a perspective view of the mushroom head shown in the embodiment of FIG. 8;

FIG. 10 is a modified embodiment of the mushroom head related to plastic material eyeglasses frames;

FIG. 11 is an exploded view of a modified embodiment of the hinge according to the invention; and FIG. 12 illustrates in section the assembling of the devices shown in FIG. 11.

DESCRIPTION OF THE PREFERRED EMBODIMENTS

Making reference to the drawing views, this invention may be seen to comprise a leg 1 which is associated with a hollow metal pocket 2 having, in the embodiment of FIG. 1, a substantially square cross-sectional configuration.

The two parts 1 and 2 are associated together by inserting a nose 3 of the leg 1 into the hollow portion of the pocket element 2, followed by the insertion of a lock screw indicated at 4.

Said hollow element 2 has, at the opposite end to the end connected to the leg 1, a round head 5, and in the proximities thereof, in the two horizontal cheeks, two holes indicated at 6 which allow a screw 7 to be inserted forming the pivot element on a head member 8 which, in the instance of a metal eyeglasses frame, would be welded to a bracket-like body 9 attached to the frame 10 (FIG. 4).

Said hollow element 2, which is conveniently formed from a metal material, has a side opening 11 formed in a wall thereof, and in the instance of FIG. 1, arranged on the outward side of the leg to extend along the pocket element substantially over nearly one half its length from the rounded head 5.

Said opening 11 does not extend across the entire width of the wall but only the middle region thereof.

Inserted into said pocket 2, through the open side opposite to where the leg 1 has been previously mounted, are two longitudinal plates 12 and 13 which are contained within the pocket and do not interfere with the opening 11.

The plate 12 has a through hole, indicated at 14, intended to align with the hole 6, and the plate 13 has a corresponding threaded hole 15 wherein the screw 7 is threaded which is also passed through the hole 16 formed in the mushroom head 8.

Through the gap left between the two plates, 12 and 13, which corresponds, therefore, to the width of the opening 11 as well as to the thickness of the mushroom head 8, a leaf spring 17 is inserted which comprises three lozenge-shaped elements, a first whereof is indicated at 18 and identical to the others, said elements being obtained by stamping from a flexible metal foil material.

Said lozenge-shaped elements have one end, which will be that to be inserted into the pocket, formed with a lug 19 which, on insertion of the element into the pocket, interlocks with a rectangular hole 20 provided in the opposite wall of the pocket 2 to that having the opening 11.

At the middle region of the lozenge-shaped element 18 is a pivotal movement shoulder 21 which abuts the inside edge 22 of the opening 11 which will define the pivot point for the leaf spring 17.

The opposite end 23 of the leaf spring 17 acts directly on all the substantially mutually orthogonal surfaces 24 and 25 of the mushroom head 8, to produce the elastic bias force.

As a direct extension of the surface 25, there is a rounded cutout 26 accommodating the end 23 to enable further rotation of the leg 1 and form the travel limit stop in the extra opened condition.

It should be noted that the leaf spring 17 is inserted with the whole structure forming the hinge already assembled and the screws inserted, from the outside by pushing it into the pocket 2.

The operation of the hinge and related elastic device may be appreciated from the foregoing description and accompanying drawings.

The leaf spring 17 operates by deformation of two parts, one internal to the pocket and extending from the pivot point 21 to the interlock point 19, and one external and extending from the pivot point 21 to the end 23 acting on the head member 8. It will be apparent how the spring may be fabricated, by merely stamping it from a flexible steel sheet, and how the length of the lever arms extending from the pivot point 21 allows utilization of very low thrust forces on the head member, owing to the surface 25 forming with the hole center a relatively long lever arm, thereby the head member may be extruded even from non-hard materials such as nickel silver or untreated steel.

The possibility of inserting the spring after the leg/-hinge assembly has been assembled allows any types of treatment of the metal material which makes up the various parts without affecting the elastic properties of the leaf spring.

The arrangement of the two surfaces 24 and 25 acted upon by the free end of the spring allows the establishing of the two stable leg positions, that is a closed position corresponding to the surface 24 and an opened position normal to the frame which corresponds to the surface 25, while the cutout 26 enables an additional opening position with respect to the normal opened position and with spring return.

In a modified embodiment shown in FIGS. 8 and 9, the leaf spring, now indicated at 117, is arranged in a reverse position with respect to the former discussed hereinabove.

More particularly, the pocket element 102 has now the opening 111 on the inward side of the leg, now indicated at 101 and being connected to the element 102 again through a nose 103 inserted with a locking screw 104.

The leaf spring 117 is quite identical to the one already discussed, whereas the head member 108 associated with the bracket element 109 is configured to be a mirror-image of the former, it still having two mutually orthogonal surfaces, respectively 125 and 124, which are acted upon by the end 123 of the leaf spring 117, and a further surface 126 forming a corner with the surface 125 for allowing said extra-opened position.

In this particular instance, it has been necessary to provide an unobstructed seat, indicated at 127, through which the end 123 of the leaf spring 117 can be passed to move into a position of fully closed condition of the leg 101.

Where the eyeglasses frame is formed from a plastic material, the head member should have the configuration shown in FIG. 10, that is comprise a shaped plate 201 which has its end on the pivoted side 202 provided with the two mutually orthogonal surfaces 203 and 204 whereon the leaf spring, not shown, would act.

Thus, there will occur a stepped down cross-section allowing an orthogonal bearing plate 204' to be inserted which permits the remaining portion to be embedded in the eyeglasses frame, there being again expediently provided a hole 205 enabling the introduction of a retaining peg 206.

Illustrated in FIGS. 11 and 12 is a further embodiment of the inventive hinge.

In this embodiment, the leaf springs, now indicated at 301, are still lozenge-shaped and are used in a multiple set. Said springs have at one end a recess 302 adapted to hook over an anchoring ridge 303 provided at one end of a stamped metal leg 304.

The springs 301 are, therefore, enclosed within a hinge body 305 machined from a metal section which is welded to the leg 304.

Said body 305 has on the front two holes, one of which is shown and indicated at 306, which allows a pin, not shown, to be inserted therethrough which is also passed through a hole 307 provided in a plate 308 made rigid with a bracket element 309 which is connected to the front 310 of an eyeglasses frame.

Said plate 308 also forms the cam whereon the end of the springs 301 acts elastically.

In this embodiment, the springs 301 are no longer exposed to view but rather fully contained within the eyeglasses legs, thus affording a greatly improved outward appearance.

This hinge, both as discussed in connection with its basic embodiment and variations, affords elasticity and an extra opened position both with metal frames and frames which are formed throughout or in part from plastic materials.

The main advantages of the invention just described reside, on the one side, in that the various parts may be readily manufactured by merely stamping out metal plates, and in that the materials are not liable to develop problems from wear and may, accordingly, be less than specially hard and have untreated surfaces.

An added advantage is that the length of the leaf spring affords, as mentioned, specific bias forces which are adequately weak with attendant low wear of the parts involved.

A further important advantage is that the leaf spring can be inserted after all the other parts have been fully assembled and has been subjected to all of the processing steps envisaged.

This affords a more economical manufacture and a finished product which has aesthetic characteristics far better, and costs much lower, than with the procedures followed heretofore.

The faculty of providing the openings for the leaf springs either on the outward side or inward side relatively to the leg also affords a high degree of design freedom to achieve unconditioned styling features.

Of course, on the basis of the same inventive idea, many different embodiments are feasible in practice without departing from the protection scope of this patent.

In practicing the invention, the materials and dimensions may be any selected ones to meet individual requirements.

We claim:

1. An elastic-hinge mounted temple for an eyeglass bow, comprising a head member rigid with a front portion of the eyeglass bow and a leg member pivoted to said head member, said leg member including a tubular portion accommodating therein a leaf spring with a substantially lozenge shape in the unbiased condition thereof, said leaf spring being secured to said leg member with a first end thereof, urging against said head member with a free end thereof, opposite to said first end, and selectively acting upon a part of said tubular portion with a middle portion thereof, said leaf spring middle portion operating as a pivot axis for said leaf spring free end during the pivotal movement of said leg member, said head member having a first engagement surface, a second engagement surface substantially transverse to said first engagement surface and a recess seat for said leaf spring free end, said first and second surfaces and said recess seat cooperating with said leaf spring free end to define an opened and a closed stable angular position of said leg member and an unstable elastic-return extra-opened position of said leg member wherein said leaf spring is elastically deformed with respect to said substantially lozenge shape.

2. A temple according to claim 1, wherein said recess seat is formed as an extension of one of said engagement surfaces thereby said leaf spring free end entering said recess seat in said extra-opened position of said leg member.

3. A temple according to claim 1, wherein said leaf spring first end presents a slot and said tubular portion has a ridge cooperating with said slot for securing said leaf spring in said tubular portion.

4. A temple according to claim 1, wherein said leaf spring comprises a plurality of stamped flexible metal foils.

5. An elastic-hinge mounted temple for an eyeglass bow, comprising a head member rigid with a front portion of the eyeglass bow and a leg member pivoted to said head member, said leg member including a tubular portion having a lateral opening and accommodating therein a leaf spring with a substantially lozenge shape in the unbiased condition of said leaf spring, said leaf spring being secured to said leg member with a first end thereof and having a free portion extending along said lateral opening, said free portion defining a leaf spring free end, opposite to said first end and urging against said head member, said leaf spring free portion selectively engaging an edge of said lateral opening at a middle edge of said leaf spring thereby defining a pivot axis for said leaf spring free portion during the pivotal movement of said leg member with respect to said head member, said head member having a first engagement surface, a second engagement surface, substantially transverse to said first engagement surface, and a recess seat for said leaf spring free end, said first and second engagement surfaces and said recess seat cooperating with said leaf spring free end to define an opened and a closed stable angular position of said leg member and unstable elastic-return extra-opened position of said leg member wherein said leaf spring is elastically deformed with respect to said substantially lozenge shape.

6. A temple according to claim 5, wherein said tubular portion has substantially quadrangular cross-section and said lateral opening extends over about one half of the length of said tubular portion, thereby about one half of said leaf spring is enclosed within said tubular portion and about one half thereof forming said free portion extends along said lateral opening.

7. A temple according to claim 5, wherein said tubular portion has substantially quadrangular cross-section with at least two opposite longitudinal walls forming respectively an internal and an external wall of said leg member in the closed position thereof, one of said opposite walls comprising said lateral opening and the other of said opposite walls defining a seat for said leaf spring first end.

8. A temple according to claim 5, wherein said leaf spring comprises a plurality of stamped flexible metal foils.

9. A temple according to claim 5, wherein said recess seat is defined by a reduced thickness middle portion of said head member, and said first and second engagement surfaces are formed on a protruding end portion of said head member and are adjacent to each other at a substantially right angle, with said first engagement surface facing said recess seat to define therewith said stable closed position of said leg member, said second engagement surface cooperating with said leaf spring free end for defining said stable opened position of said leg member, said second engagement surface forming a corner with a further surface of said head member protruding end portion, opposite to said first engagement surface, said corner cooperating with said leaf spring free end defining said unstable elastic-return extra-opened position of said leg member.

10. A temple according to claim 5, wherein said recess seat is a cavity formed in one of said engagement surfaces which defines said stable opened position of said leg member, thereby said leaf spring free end entering said cavity in said extra-opened position and said cavity forming a travel limit for said extra-opened position.

* * * * *